Jan. 13, 1959

L. E. HOYER ET AL 2,868,595

JOURNAL BOXES

Filed Feb. 6, 1956

INVENTORS
LLWELLYN E. HOYER
ISAAC E. COX

BY Wallace and Cannon ATTORNEYS

Jan. 13, 1959    L. E. HOYER ET AL    2,868,595
JOURNAL BOXES

Filed Feb. 6, 1956    2 Sheets-Sheet 2

INVENTORS
LLWELLYN E. HOYER
ISAAC E. COX
BY
*Wallace and Cannon* ATTORNEYS

United States Patent Office 2,868,595
Patented Jan. 13, 1959

2,868,595

JOURNAL BOXES

Llewellyn E. Hoyer, Wyckoff, N. J., and Isaac Eugene Cox, Kirkwood, Mo., assignors to American Brake Shoe Company, New York, N. Y., a corporation of Delaware Application February 6, 1956, Serial No. 563,672

5 Claims. (Cl. 308—38)

This invention relates to journal boxes such as journal boxes for railway cars.

The journal box of a railway car, in which is disposed the bearing for the car axle, is also adapted to hold a lubricator and a supply of lubricant for lubricating the bearing and the car axle. The usual practice in the past has been to relay lubricant to the axle of the car by absorbent waste packing, but since this appears to be a primary cause of hot boxes it has more recently been proposed to eliminate waste packing as a means for furnishing lubricant to the axle.

The journal box is associated with the truck of the car, and inasmuch as lateral motion of the truck is rather severe at times, there is a tendency for the body of lubricant in the bottom of the journal box to be thrown, and spill or seep through incompletely sealed portions adjacent the closure lid at the outer or exposed end of the box. While the quantity of lubricant thus lost may not be excessive at any one time, repeated occurrences of this kind entail an appreciable depletion of lubricant contributing to hot box occurrences. The primary object of the present invention is to baffle a journal box that is subject to lateral motion so as to substantially prevent the attendant loss of lubricant that may occur as an incident thereto.

Specifically, the object of the present invention is to guard the lower lip of an opening in the journal box so as to reduce the likelihood of appreciable loss of lubricant due to motion of the journal box that causes the lubricant to shift bodily and in a violent manner toward such opening.

Other and further objects of the present invention will be apparent from the following description and claims and are illustrated in the accompanying drawings which, by way of illustration, show preferred embodiments of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a top plan view of a standard A. A. R. journal box;

Figure 1:
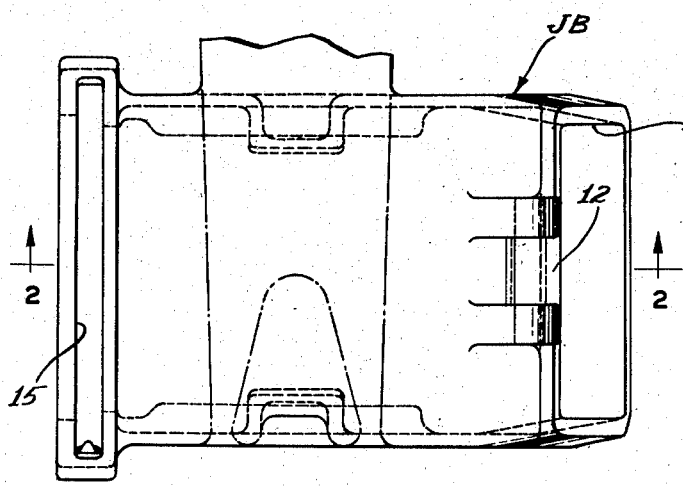

The present invention is illustrated in the drawings as embodied in a journal box JB of the so-called integral type, which is to say that the journal box herein illustrated for purposes of disclosure is of the kind that is cast integral with the truck of the car, but it will be appreciated that the invention is also applicable to the other kinds of journal boxes, namely, the pedestal type and the separable bolted type.

Figure 2:
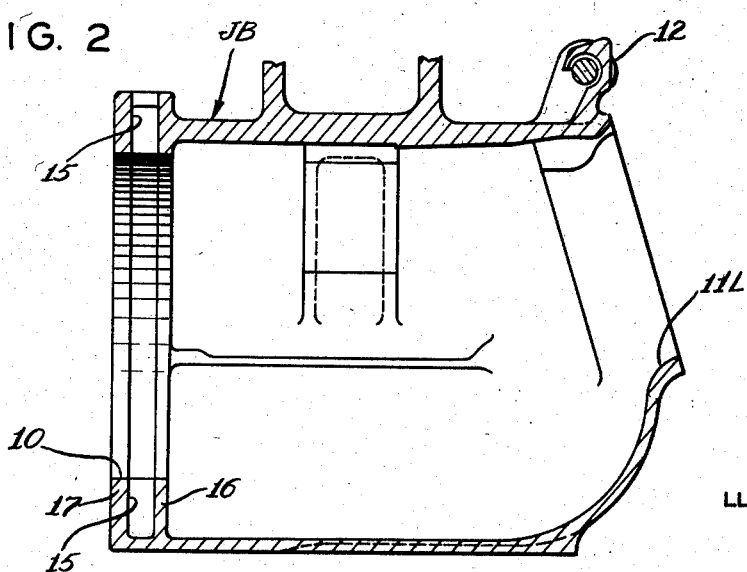
Fig. 2 is a sectional view taken substantially on the line 2—2 of Fig. 1.

The journal box JB is adapted to house what is referred to as a partial journal bearing (not shown) for rotatably supporting the end of the car axle (not shown) disposed within the box, the axle of the car being extended into the box through an opening 10, Fig. 2, on the wheel side of the box. The hub of the axle terminates short of the usual opening 11, Fig. 1, afforded at the front of the box enabling the interior of the box to be inspected and packed, the supply of lubricant replenished, and the waste packing, where used, or other lubricator changed if required. The opening 11 is adapted to be closed by a lid (not shown) and hinge means 12, Figs. 1 and 2, of the usual kind are afforded at the top of the box over the upper edge of the opening 11 for pivotally mounting such closure lid.

When the journal box is operatively associated with the car axle, a cavity is available at the bottom of the box for a lubricator and a supply of lubricant. In this connection, it may be pointed out that the journal box is formed at the inner or rear end with a vertical dust guard slot 15 afforded by a pair of spaced apart walls 16 and 17. The slot 15 is adapted to slidably receive a conventional dust guard (not shown) having a relatively large opening formed medially therein through which the car axle is extended, and the arrangement is such that the dust guard seals off the open portion of the journal box between the car axle and the opening 10.

As was mentioned, the motion of the car may be severe in some instances such that the body of oil at the bottom of the journal box tends at times to be thrown in the direction of the front opening 11. To overcome the tendency for the oil to escape through incompletely sealed portions at the front and rear of the box, the lower edge 11L, Fig. 2, of the opening 11 is baffled, as will now be described.

Figure 3B:
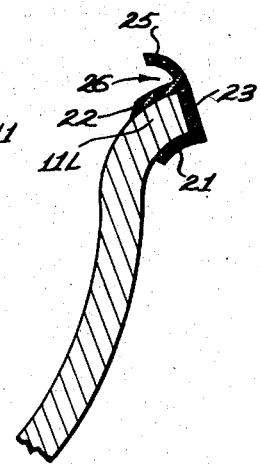
Fig. 3B is a detail sectional view showing the baffle plate of Fig. 3 in place.
Figure 3:
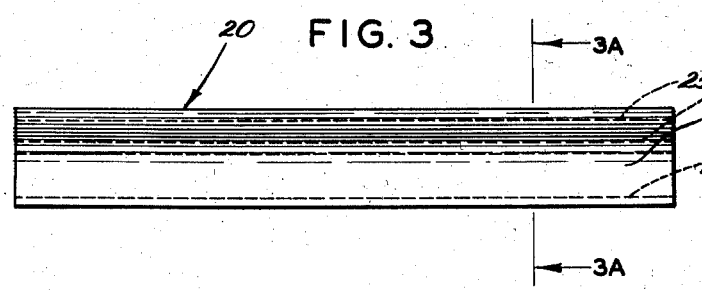
Fig. 3 is a plan view of one form of detachable baffle plate for the front of the box.
Figure 3A:
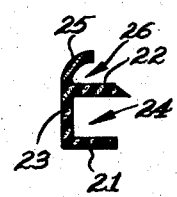
Fig. 3A is a sectional view taken on the line 3A—3A of Fig. 3.

One form of the present invention is illustrated in Figs. 3 and 3A as embodied in a resilient or deformable baffle plate 20 which is adapted to be detachably mounted on the lower edge 11L of the front opening 11 in the journal box. The baffle plate 20 may be constructed of many different materials, but we prefer that these be in the form of a resilient oil-resistant material which can be quickly pressed on to the lip 11L and retained in place by its own tension. Among the materials that can be resorted to with this purpose in mind are oil-resistant hard rubber, polyethylene, Neoprene foam rubber and the like.

As was mentioned, the baffle plate 20 is only for the lower edge lip 11L at the front of the box, and hence the length of the plate 20 will correspond to the width of the opening 11. The plate 20 includes a pair of parallel, spaced apart elongated bottom and top walls 21 and 22 of a length corresponding to that of the edge 11L. The two walls 21 and 22 are connected by a web or front wall 23 so that the arrangement affords a U-shaped channel 24 in which the edge 11L at the front of the box is to be received. In this connection, it will be recognized that the inherent resiliency of the material of which the baffle plate is composed enables the baffle to conform to the contour of the lip 11L as shown in Fig. 3B so that a firm clasp is afforded to hold the baffle to the front of the box.

The baffle 20 is also formed with an arcuately shaped rearwardly extending flange 25 which is spaced above the upper wall 22, and the relation is such that the flange 25 extends generally parallel to the wall 22 so as to be open in the direction of the channel 24 and afford a trap 26 thereabove tending to prevent the escape of lubricant forwardly past the lower edge 11L at the front of the journal box.

In other words, the flange 25 extends inwardly of the journal box substantially normal to the front wall or web 23 of the baffle. One advantage of the construction of the plate 20 is that this baffle plate, being at the bottom only of the opening 11, will account for venting of the journal box, since the closure lid that was mentioned above will at the lower edge thereof rest on the web 23 of the baffle plate and hence the closure lid will be opened by this small amount to vent the interior of the box. The baffle plate to be described below enables the front opening 11 in the journal box to be completely closed off where this is desired.

Figure 4:
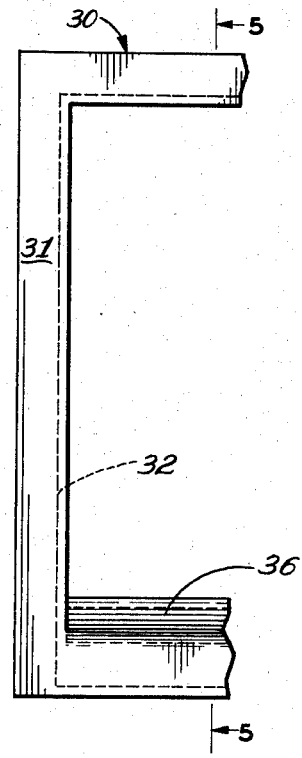
Fig. 4 is a fragmentary elevation of a modified form of baffle plate for the front of the box.
Figure 5:
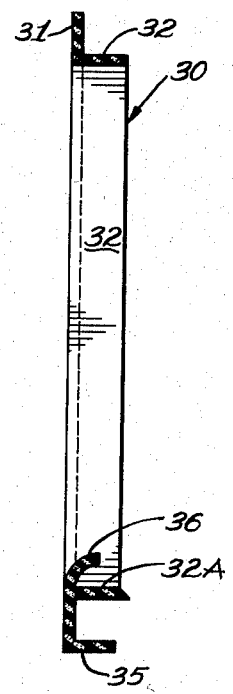
Fig. 5 is a sectional view taken on the line 5—5 of Fig. 4.
Figure 5A:
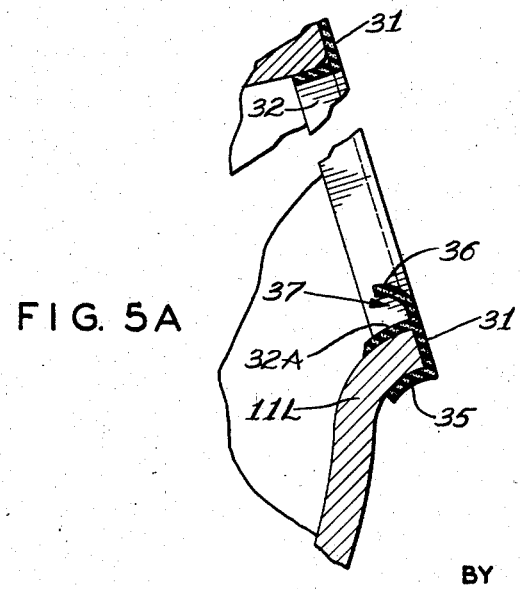
Fig. 5A is a sectional view showing a modified form of the front baffle plate in position.

The baffle plate 30 shown in Figs. 4, 5 and 5A is of continuous, rectangular form so as to fit entirely about the peripheral edge of the front opening 11 in the journal box. Thus, the baffle plate 30 includes a rectangular outer web or front wall 31 serving as a gasket adapted to seal the forward face of the box about the opening 11 as shown in Fig. 5A. Extending rearwardly at right angles to the web 31 is a continuous rectangular wall 32, and this wall constitutes in effect a sleeve adapted to telescope into and engage about the inner marginal portion of the opening 11.

The baffle plate 30 is composed of material of the kinds mentioned above so as to be capable of holding itself to the front of the journal box. Associated with the lower side 32A, Figs. 5 and 5A, of the wall 32 is another wall 35 which is parallel thereto and spaced therebelow, and these walls are so related as to embrace or clasp opposite sides of the lower edge 11L of the opening 11 at the front of the journal box as shown in Fig. 12A. Under such circumstances, the inner wall 32 extends entirely about the inner margin of the opening 11, and the outer wall 31 extends entirely about the outer face of the opening 11. Extending above the wall 32A and projecting in a general rearward direction is a flange 36 which, as in the foregoing embodiment of the invention, is above the level of lubricant in the journal box to afford a rearwardly opening oil trap 37 serving to prevent the escape of lubricant moving in the direction of the front end opening 11.

In connection with the baffle plate 30, it is important to point out that under this form of the invention the outside or front wall 31 affords a continuous gasket which, when the lid at the front of the box is closed, effectively seals off the box so that there is no venting of the box as in the foregoing embodiment.

Figure 6:
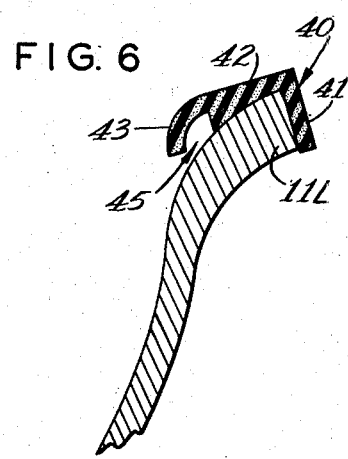
Fig. 6 is a sectional view of a modification.

Either baffle means 20 or 30 may be modified structurally as shown in Fig. 6 to reduce, if desired, the extent to which the lip of the baffle projects above the lower edge of the front opening in the journal box. Thus, the baffle 40, Fig. 6, is of oil resistant foam material or the like and includes a front wall 41 and a top wall 42 configured complementary to the corresponding portions of the journal box defining the lower edge of the front or access opening therein. It will be observed that the top wall 42 is progressively thickened proceeding in an inner direction, and at the inner end the top wall 42 is provided with an arcuate, downwardly extending baffle lip 43 affording an oil trap 45 between the lip 43 and the opposed surface of the journal box. It will be further observed that the top wall 42 of the baffle 40 is flat and that the uppermost portion of the lip 43 is co-planar with the upper face of the wall 42 so as not to protrude above the top wall 42 of the baffle 40.

The baffle 40 may be cemented in place in those instances where such is acceptable. However, the baffle 40 may include a lower wall as 21 or 35 above to afford a clasp retention.

It will be seen from the foregoing that under the present invention there is attained increased efficiency in the lubrication of a journal bearing where resort is had to lubricant retained in the bottom of the box.

Hence, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. In a railway car journal box having a top wall, spaced side walls and a bottom wall and an opening in the rear thereof through which the journal portion of the car axle is to be extended, and wherein said walls of the journal box have front edges lying in a common plane and defining a front opening in the box adapted to be closed by a lid, a separate oil baffle of resilient material mounted on at least the front edge portion of the bottom wall of said journal box, said baffle including a front wall having a rear surface engaging the terminal front edge surface of the bottom wall of said journal box and a top wall having a lower surface engaging a portion of the upper surface of the bottom wall of said journal box inwardly of said front opening, said baffle having a flange free of any surface of said journal box and projected inwardly of the journal box a substantial distance to afford an oil trap of appreciable depth between said flange and the bottom wall of said journal box, the front opening in said journal box being substantially fully disclosed except for the areas thereof occupied by said walls and said flange of said baffle.

2. An arrangement according to claim 1 wherein the front wall of said baffle is continuous about the entire front edge surface of the front opening in said journal box.

3. An arrangement according to claim 1 wherein said baffle includes a bottom wall parallel to and spaced from said top wall of said baffle and which engages the lower outer surface of the bottom wall of said journal box.

4. An arrangement according to claim 1 wherein a portion of the upper surface of said flange is coplanar with the upper surface of said top wall of said baffle and wherein said flange is arcuate and bends inwardly toward the bottom wall of said journal box.

5. An arrangement according to claim 1 wherein said baffle is provided only on said front edge portion of the bottom wall of said journal box to thereby afford spacing between the lid of the journal box and said front opening thereof to vent the journal box.

References Cited in the file of this patent

UNITED STATES PATENTS

| | | |
|---|---|---|
| 1,009,986 | Murray | Nov. 28, 1911 |
| 2,281,352 | Hannaford | Apr. 28, 1942 |
| 2,498,245 | Bryant | Feb. 21, 1950 |
| 2,540,662 | Foss | Feb. 6, 1951 |